United States Patent [19]

Müller

[11] Patent Number: 4,552,666
[45] Date of Patent: Nov. 12, 1985

[54] PROCESS FOR THE TREATMENT OF SEWAGE SLUDGE

[76] Inventor: Dietrich Müller, Handelmannweg 1, D-2000 Hamburg 52, Fed. Rep. of Germany

[21] Appl. No.: 554,712

[22] Filed: Nov. 23, 1983

[30] Foreign Application Priority Data

Nov. 26, 1982 [DE] Fed. Rep. of Germany ....... 3243827

[51] Int. Cl.$^4$ .............................................. C02F 11/12
[52] U.S. Cl. ...................................... 210/710; 44/1 D; 44/10 A; 71/23; 210/730; 210/751; 210/770
[58] Field of Search .................. 44/1 D, 10 A; 71/13, 71/22, 23; 210/609, 631, 710, 716, 730, 768, 769, 751, 770, 771; 241/16, 21

[56] References Cited

U.S. PATENT DOCUMENTS

| | | | |
|---|---|---|---|
| 1,439,188 | 12/1922 | Poock | 71/13 |
| 2,861,877 | 11/1958 | Geraghty et al. | 71/13 |
| 3,222,160 | 12/1965 | Ramus | 71/23 |
| 3,365,395 | 1/1968 | McDonald | 71/12 |
| 3,944,408 | 3/1976 | Postrihac | 71/13 |
| 4,161,825 | 7/1979 | Maffet | 34/12 |
| 4,201,551 | 5/1980 | Lyshkow et al. | 44/1 D |
| 4,308,047 | 12/1981 | Holland | 71/23 |

FOREIGN PATENT DOCUMENTS 1145646 3/1963 Fed. Rep. of Germany .
58-067399 4/1983 Japan .................................. 210/730

OTHER PUBLICATIONS

Gesundhats Ingenieur, No. 36 (1935), pp. 558–559.
Lehr-und Handbuch der Abwassertechnik, vol. 3 (1969), pp. 194 and 205.
Zeitschrift Gesundheitsingenieur, 3/1950, pp. 56–59 (translation of 56–58 only).

*Primary Examiner*—Peter Hruskoci
*Attorney, Agent, or Firm*—Cushman, Darby & Cushman

[57] ABSTRACT

The invention relates to a process, which is characterized by mixing sewage sludge with comminuted, dried autumn foliage or the solvent extraction residue thereof. It also relates to the use of the deformable and optionally dried material obtained as a fuel briquette, and the use of the ash obtained after burning the fuel briquette as a fertilizer component.

10 Claims, No Drawings

PROCESS FOR THE TREATMENT OF SEWAGE SLUDGE

BACKGROUND OF THE INVENTION

The invention relates to a process for the treatment of digested sewage sludge, as well as the use of the products obtained as fuel briquettes or as a supply of fertilizer components.

The elimination of sewage sludge causes considerable difficulties, particularly in connection with municipal drainage. The hitherto adopted practice of dumping the sludge into the sea is not only uneconomical due to the high transportation costs, but to protect the environment is also only possible to a limited extent.

The treatment of sewage sludge for obtaining usable end products or harmless constituents is an important problem, particularly in large cities. It is known that sewage sludge can be digested for obtaining methane, or can be stored. This involves considerable costs for the storage tanks and the removal of the digested sewage sludge still constitutes a problem. The use of concentrated sewage sludge as a soil conditioner is problematical, due to the low concentration of substances having a fertilizing action.

It is also known to concentrate the sewage sludge or the digested sewage sludge with a solids content of approximately 2 to 5% in a settling tank, until a solids content of approximately 10% by weight is obtained. The predrained or concentrated sludge can then be further concentrated to a solids content of approximately 30 to 50% by weight by means of centrifuges or filter presses. Both sludge concentration in settling tanks and draining by centrifuges and filter presses are extremely uneconomical, particularly as a considerable amount of energy is required for the final sludge drying to a residual water content below 50%, while still not leading to the elimination of the dried residual sludge.

The problem of the present invention is to treat sewage sludge and particularly digested sewage sludge in such a way that no by-products prejudicial to the environment are obtained and so that the resulting products can be advantageously used.

SUMMARY OF THE INVENTION

For the solution of this problem, there is proposed a process for the treatment of digested sewage sludge which process is characterized by the sewage sludge is mixed with dried autumn foliage or the extraction residue thereof.

It has surprisingly been found that dried, ground autumn foliage or the solvent extraction residue thereof can be used in a highly advantageous manner for sedimenting sewage sludge and, upon adding large quantities, plastically deformable materials are obtained which, optionally after further drying, give fuel briquettes, which have a considerable calorific value. The ash of such fuel briquettes supplies a considerable concentration of substances active as fertilizers.

It has already been proposed according to DOS No. 3243282.8 and corresponding Muller U.S. application Ser. No. 554,713, filed Nov. 23, 1983 entitled "Process And Apparatus For Obtaining Raw Materials From Autumn Foliage", the entire disclosure of which is hereby incorporated by reference and relied upon, that the autumn foliage obtained in great quantities be comminuted for obtaining raw materials, followed by drying and extraction in one or more stages. Valuable constituents can be separated from the extracts and the residue can be used as fuel. Both the comminuted or ground autumn leaves, as well as the residue after the extraction thereof are particularly suitable for binding the ballast water from sewage sludge. In general one part by weight of ground leaves to between 3 and 6 parts by weight of sewage sludge, or one part by weight of solvent extraction residue of ground leaves per 6 to 10 parts by weight of sewage sludge, in each case based on a sewage sludge with a 10% by weight solids content, is suitable for obtaining from the sludge a plastically deformable material which, after drying, can be used as fuel briquettes. Sewage sludge with a higher or lower solids content requires higher or lower added leaf quantities in order to bind the ballast water thereof. On a dry basis for example for one part by weight of ground leaves there can be employed 0.3 to 0.6 of the sewage sludge for one part of solvent extraction residue 0.6 to 1.0 part of the sewage sludge.

According to a particularly preferred process, the sewage sludge is mixed in stages with the autumn foliage or its solvent extraction residue. At least part of the water can be removed from the sewage sludge prior to said addition, or prior to a partial addition. For example, a sludge already cncentrated in the settling tank can be mixed with the comminuted and dried foliage or its solvent extraction residue. It is also possible to mix in smaller proportions previously untreated sludge or a sludge which has already been thickened to an approximately 15% solids content, with the autumn foliage or its extraction residue. Following sedimentation of the solids, further water is extracted, in order to produce a plastically deformable material, following further addition of autumn foliage or its extraction residue.

It is surprising that the comminuted dried autumn foliage or its solvent extraction residue can counteract the high water binding capacity of sewage sludge and that the thickened sewage sludge binds the mixture into a cohesive plastic material. It is also surprising that the thus obtained deformable materials can easily be briquetted and relatively rapidly dried in air. This can in fact take place to residual moisture contents of approximately 4% whereas, without the addition of leaves, the drying of sewage sludge alone stops at about 14%.

As a result of the process according to the invention the difficult to handle and difficult to burn sewage sludge leads to a valuable fuel material due to the addition of comminuted and dried autumn foilage or the solvent extraction residue thereof. The sewage sludge proportion represents 3,300 kcal/kg of dry substance and the autumn foilage proportion is approximately 5,000 kcal/kg.

The fuel briquettes obtained burn in much the same way as lignite briquettes. Due to the sewage sludge proportion, the ash content is relatively high, but contains a number of inorganic water-soluble salts and particularly compounds containing potassium, nitrogen and phosphorus, which can be used as fertilizers after corresponding further processing and after separation from the heavy metals present.

The formation of the extraction residue is described in the following examples from Muller application Ser. No. 554,713.

EXAMPLE 1

Fallen autumn copper beech leaves were collected and finely ground in air-dry form until the starting volume was reduced to 1/27. 34.38 g of ground leaves were exhaustively extracted for 4 hours in a conventional 250 ml Soxhlet apparatus. Trichloroethylene from group A with $\xi=3.4$ was used as the solvent. The extract solution obtained was evaporated by means of a rotary evaporator and a yield of 1.98 g=5.76% of the starting weight was obtained.

The extract obtained had a specific aroma like patchouli/eucalyptus and was used for preparing a fragrance in ethyl-alcohol solution with the same aroma rating.

The residue after trichloroethylene extraction was mixed, after drying, in a 1 liter flask with 300 ml of water as the solvent from group B with $\xi=78$ and was extracted for 2 hours by refluxing. The solution was then filtered under a water jet vacuum by means of a suction bottle, Buchner funnel and filter paper, concentrated and dried in the drying oven at 105° C. The yield was 3.52 g=10.24% of the starting weight.

1 g of this extract was dissolved in boiling water and, when mixed with sugar, there was obtained a spicy tasting, dark brown, non-alcoholic hot drink with a cocoa/coffee-like taste.

After aqueous extraction, the residue was mixed with 200 ml of a sulphuric acid solution with a pH-value of 1 as a group C solvent having an $\xi=>80$ and was extracted by refluxing for 2 hours and filtered in the aforementioned manner. The yield was 6.58 g=19.14% of the starting weight. The brown-black powdery extract material smelled like breadcrumbs.

Following $H_2SO_4$ extraction, the residue was dried at 105° C. in the oven and weighed 20.35 g=59.19% of the starting weight. The residue was then mixed with a solution of 1 g of the material extracted by sulphuric acid and 20 ml of water. A kneadable pulp was obtained which was shaped into balls. The balls retained their shape after air drying and consequently demonstrated the use of the extract as a binder.

Based on immediate analysis, there was carried out a roughly estimated rapid determination of the calorific value of the air-dry total residue.

Water

The difference between the weighed in and weighed out quantities (weighed in quantity 15 g) after 2 hours drying in the oven at 105° C. was 6.55.

Ash 1 g of substance was kept in a flat porcelain dish over a powerful Bunsen flame, accompanied by air access, for 2 hours—weighed out quantity 1.5%. The material burned with a dull, long flame.

CRUCIBLE YIELD, VOLATILE CONSTITUENTS 1 g of substance was held over a powerful Bunsen flame for 7 minutes in a covered porcelain crucible—weighed out quantity 28.5%=T.

| Volatile constituents = deficit/moisture | |
|---|---|
| Substance: | 100.00 |
| Coke yield: | 28.50 |
| | 71.50 |
| Moisture: | 6.50 |
| Volatile constituents = | 65.00% |

Calorific Value

The calorific value calculated according to the Harpener formula:

$$H = 3664 + 112.1T - 0.6574\ T^2,$$

was 6325 kcal/kg. The material balance for this 3-stage extraction was as follows:

| Starting weight | | 34.38 g = | 100.00% |
|---|---|---|---|
| Trichloroethylene extract | 1.98 g = | 5.76% | |
| Water extract | 3.52 g = | 10.24% | |
| $H_2SO_4$ extract | 6.58 g = | 19.14% | |
| Total extract | 12.08 g = | 35.14% | |
| Residue | 20.35 g = | 59.19% | |
| | | 32.43 g = | 94.33% |
| Experimental losses | | 1.95 g = | 5.67% |

EXAMPLE 2

Fallen autumn walnut leaves were treated in the same way as in Example 1, but in the third extraction stage the use of sulphuric acid was replaced by a KOH solution ($\xi > 80$) at a pH-value of 8. The following results were obtained:

| Starting weight | | 48.84 g = | 100.00% |
|---|---|---|---|
| Trichloroethylene extract | 2.62 g = | 5.72% | |
| Water extract | 6.97 g = | 15.21% | |
| KOH extract | 6.02 g = | 13.13% | |
| Total extract | 15.61 g = | 34.06% | |
| Residue | 28.85 g = | 62.94% | |
| | | 44.46 g = | 97.00% |
| Experimental losses | | 1.38 g = | 3.00% |

The calorific value determined by immediate analysis as in Example 1 was approximately 6000 kcal/kg.

Sulphur

The dry total residue underwent a qualitative Hepar test and no sulphur was detected.

The trichloroethylene extract had a specific aroma like marjoram/rosemary and was used in the following way to produce a skim cream.

5.4% of glycerine, 0.4% of triethanol amine, 0.3% of 50% NaOH and 69.0% water were emulsified at 75° C. into an oil phase of 10.8% stearic acid and 5.4% glycerin monostearate. The mixture was stirred cold and mixed at 40° C. with 8% of a 28% walnut extract solution in ethanol.

A cream, which could easily be rubbed into the skin, was obtained with the aforementioned aroma. Surprisingly, when used in a repeated manner, this cream had the property of lightening freckles, so that is must be assumed that walnut extract acts pharmacologically in this way.

15g of the total residue were kept for 90 minutes at 140° C. in the drying oven. A further trichloroethylene extraction therefrom gave a further yield of 0.18 g=1.2%=21% of the first trichloroethylene extract.

EXAMPLE 3

In the same way as in Example 1, fallen autumn foliage of the horsechesnut was successively treated with the following solvents: first stage: "Kaltron 113" ($\xi<30$) (Kali-Chemie AG, Hannover) b.p. 47.7° C. in the Soxhlet apparatus; second stage: methanol ($\xi=32.6$) in the Soxhlet apparatus; third stage: water, refluxing. The results were as follows:

Starting weight 26.48 g=100.00%
Kaltron extract 1.12 g=4.57%
Methanol extract 3.27 g=12.35%
Water extract 4.21 g=15.90%

The Kaltron extract was used for producing a wood preservative, by heating the latter on the water bath in a small Erlenmeyer flask, accompanied by partial melting. Accompanied by agitation, this product was poured into a small beaker with 3 ml of turpentine oil. After a few hours, a dark, lard-like material was obtained. When it was rubbed on wood, it gave a polished effect to the wood, was water-repelling and had a pleasant smell.

The three-stage extraction of the horsechestnut leaves was repeated, but on this occasion in the following order: first stage: methanol in a Soxhlet apparatus; second stage: Kaltron in a Soxhlet apparatus; third stage: water, refluxing. The following results were obtained:
Starting weight 32.33 g=100.00%
Methanol extract 6.00 g=18.56%
Kaltron extract 0.93 g=2.88%
Water extract 2.08 g=6.43%

It was found that the solvents were extractive in an overlapping manner and that a solvent with a moderate polarity, in this case methanol, $\xi=32.63$, summatively extracted groups of substance from both the nonpolar and the polar solvent range.

The methanol and Kaltron extracts had a specific aroma like jasmin/hyssop.

The calorific value of the residue of the repeated extraction of horsechestnut leaves determined by immediate analysis was approximately 550 kcal/kg, i.e. well below the value determined in Example 1, which shows that the calorific value of the residue is reduced by leaving extract portions therein.

EXAMPLE 4

A. Fallen autumn lime leaves were extracted in the same way as in Example 1, but in a Soxhlet apparatus with a heating jacket instead of in a steam pipe. The end of exhaustive extraction was made clear by a discolouration of the solution in the extraction chamber. The results were as follows:
Starting weight 27.80 g=100.00%
Kaltron extract 0.82 g=2.95%
Methanol extract 3.03 g=10.90%
Water extract 1.99 g=7.16%

B. On repeating test A with 40 ml of Kaltron in the extraction chamber during methanol extraction, the following results were obtained:
Starting weight 22.80 g=100.00%
Kaltron extract 0.66 g=2.90%
Methanol+Kaltron extract 2.42 g=10.61%
Duration: 3 hours
Water extract 2.66 g=11.67%

A comparison of tests A and B revealed that the exhaustive methanol+Kaltron extraction was obtained after a 25% shorter period and that with a very good coincidence of the extract weights of stages 1 and 2, a 63% higher water extraction yield was obtained, which must be attributed to the decomposing action of the Kaltron addition to the methanol during the preceding extraction.

The Kaltron and methanol extracts revealed a specific aroma like balm/hay.

4g of the water extract were dissolved hot in 50 ml of water and added to a Petri dish, which was exposed to the air. The dark solution immediately dried to a viscous paste. Fungi and bacteria from the air deposited on the paste and developed enormous colonies after a few weeks. This revealed that the extract could be used as a nutrient and feed.

EXAMPLE 5

Fallen autumn maple leaves were treated in the same way as in Example 4 but, in place of refluxing, water extraction was carried out by heating with water at 50° C., accompanied by magnetic stirring in an open beaker. The thick consistency of the solution was analogous to starch paste. This solution was separated by pressing with a linen cloth instead of by use of filtration.

Similar to test A above, the following results were obtained:
Starting weight 27.98 g=100.00%
Kaltron extract 1.32 g=4.72%
Methanol extract 2.95 g=10.54%
Water extract 2.56 g=9.12%

Similar to test B above, the following results were obtained:
Starting weight 23.93 g=100.00%
Kaltron extract 1.10 g=4.60%
Methanol+Kaltron extract 2.47 g=10.32%
Water extract 3.98 g=16.63%.

The two results clearly confirm the decomposing action on the leaf substance through the Kaltron addition to methanol during the following water extraction. The yield increase here was 82.3%, with very good coincidence between the extract weights of stages 1 and 2.

The Kaltron and methanol extract had a specific aroma like rosemary/orange. 2 g of the Kaltron extract were used further by melting at 80° C. in the drying oven, pouring into a small light metal mould and using a wick of a wax candle in the form of a Hindenburg light. Upon ignition, a pleasant odour was simultaneously produced outside the candle flame. This shows that the combustion products of the aromas obtained are found to be pleasant by human sensory organs.

Accompanied by vigorous magnetic stirring, 100 ml of boiling water were poured over 5.4 g of the dry water extract in a 250 ml Erlenmeyer flask. Approximately 30 ml of a filtered hot water extract of 15 g of cut up cured malt in 100 ml of water were added to the resulting creamy solution at 50° C. Stirring was continued for 1 hour at approximately 50° C. After cooling to 30° C., 3 g of water-pasted baker's-yeast were added to the solution and the flask was provided with a fermentation fixture. Fermentation took place at approximately 25° C. for approximately 4 days. The fermented solution was filtered by decanting over a folded filter and, when cooled, gave a brown, pleasantly smelling alcoholic cold drink.

EXAMPLE 6

A single-stage methanol extraction was carried out on the fallen autumn leaves of pear trees. The residue was heated and extracted again and this stage was repeated several times.

48.62 g of leaves were extracted with methanol in a Soxhlet apparatus. The residue obtained was kept for 100 minutes at 150° C. in the drying oven and then extracted again with methanol in the Soxhlet apparatus. The residue obtained was again kept for 100 minutes at 150° C. in the oven and then extracted again as previously.

The extraction yields were as follows:
1. During first extraction 14.17 g=29.14%

2. During the second extraction after heating 1.75=3.60% (12.34% of the first stage)
3. During the third extraction after heating 1.09 g=2.24% (7.69 of the first stage).

This test shows that a first heat treatment of the residue following the first extraction gave a yield increase of approximately 12% and that a second heat treatment of this further residue after the second extraction gave a further yield increase of approximately 7%, so that the total yield increase was approximately 20%.

For comparison purposes, 31 g of the same leaves were kept for 100 minutes at 150° C. in the drying oven before extraction and then extracted, giving 9.23 g=29.77%. This shows that a preextraction heat treatment only gave an extremely small yield increase of approximately 2% compared with the first extraction without heat treatment.

In all cases, the methanol extract of the leaves gave a specific aroma like jasmin/incense.

EXAMPLE 7

A multiplex extraction was carried out on the fallen autumn foilage of the snake wood tree, whose leaves are relatively rich in constituents. Aetone/methanol/water was used as the extracting agent.

32.35 g of leaves were firstly extracted with acetone (ξ=20.7) in the Soxhlet apparatus, then with methanol and then with water at 60° C. accompanied by magnetic stirring. The residue of this extraction stage was kept in the drying oven at 130° C. for 100 minutes and then extracted as hereinbefore.

For comparison purposes, 31.42 g of the same leaves were kept in the drying oven at 150° C. for 100 minutes prior to extraction and then extracted as above.

The extraction yields are given in the following Table II:

TABLE II

|  | 1st Extraction | 2nd Extraction After Heating | Comparison |
|---|---|---|---|
| Acetone | 4.26 g = 13.17% | 0.13 g = 0.40% (3.04% of the yield of 1) | 2.25% = 7.20% |
| Methanol | 5.31 g = 16.41% | 0.35 g = 1.08% (6.58% of the yield of 1) | 5.45 g = 17.45% |
| Water | 1.96 g = 6.06% | 0.71 g = 2.19% (36.14 of the yield of 1) | 1.83 g = 5.86% |
| Total | 35.64% | 3.67% (10.29% of the yield of 1) | 30.51% |

These tests show that the supplemental yield by heat treatment after the first extraction depends on the polarity of the extracting agent, i.e. in the present case with acetone:methanol:water in the ratio of 1:2:12.

The total supplementary yield was approximately 10% below the values of Example 6, which is explained by the high constituent level of the snake wood leaves. The tests also show that the heat treatment more particularly supplies water-soluble polar constituents.

In the comparison test, where the heat treatment was carried out prior to extraction, it was found that the total yield was only approximately 85% of the yield obtained by heat treatment after the first extraction. This is probably due to the fact that through the heat treatment the lighter, volatile, nonpolar constituents of the leaves are largely lost and the total yield is considerably reduced. This is dependent on the total content of the readily volatile constituents in the leaves.

The acetone and methanol extracts of snake wood leaves obtained had a specific aroma like fennel/hyssop.

EXAMPLE 8

In order to clarify the influence of the temperature level and the duration of the heat treatment on the supplemental quantity obtained, fallen apple tree leaves are extracted with acetone/methanol/water as in Example 7. The table below gives the yields of the following process stages.

Test A 31.9 g of leaves were extracted with acetone in the Soxhlet apparatus, then with methanol in the Soxhlet apparatus and then at 60° C. and accompanied by magnetic stirring with water.

Test B

The residue of test A was kept for 50 minutes at 90° C. in the drying oven and then extracted as in test A.

Test C

Prior to extraction, 30.56 g of leaves were kept at 90° C. in the drying oven for 50 minutes and then extracted as in test A.

The extract yields are given in following Table III.

TABLE III

| | | | |
|---|---|---|---|
| Acetone | 6.27 g = 20.17% | 0.06 g = 0.19% = 0.94% of the yield of A | 5.71 g = 18.69% |
| Methanol | 3.36 g = 10.81% | 0.10 g = 0.32% = 2.96% the yield of A | 3.05 g = 9.98% |
| Water | 1.80 g = 5.79% | 0.52 g = 1.67% = 28.84% the yield of A | 2.01 g = 6.58% |
| Total | 36.77% | 2.18% = 5.93% of the yield of A | 35.25% |

These results show that the quantity of the supplemental yield supplied by the heat treatment after the first extraction depends greatly on the temperature and the duration of the heat treatment, the yield decreasing with lower temperature and lower duration, as is shown by a comparison test series B with the corresponding values of Example 7. At 90° C. and 50 minutes with 5.93% of the yield of test A, approximately only half the yield of the corresponding case in Example 7 was obtained, although in both cases the leaves had a high constituent content.

The dependence of the yield on the polarity of the solvents corresponds to the values of Example 7. In Example 8 the ratio of solvents is 1:1.7:8.8.

The values of test C shows that supplemental yield supplied by the heat treatment prior to extraction under relatively cold conditions, although resulting in a lower loss of volatile nonpolar constituents and even a gain in polar constituents, results in a yield which was only roughly 95% of that of test A, i.e. the total yield was not improved.

The aroma of the acetone and methanol extract obtained in these tests was like camomile/sandelwood.

It was found that a supplement in yield could only advantageously be obtained through a heat treatment after a first extraction, whereas in the case of heat treatment prior to extraction, the volatile nonpolar constituents were lost and that such losses were unavoidable particularly under mild conditions.

In view of the pronounced temperature and time dependence of the supplemental yield by heat treatment prior to extraction, the heat treatment should not take place either at below 70° C. or for less than 20 minutes.

EXAMPLE 9

The following example shows that the multiple extractions with several solvents can also be made by steam distillation, especially under vacuum.

Fallen autumn maple leaves in finely ground form were added into a flask together with water (a solvent of group B) and heated. Some of the products obtained were dissolved, while others were driven off together with the steam. The condensed material from the steam distillation was then extracted with a solvent from group A as in Example 1.

The invention is further illustrated hereinafter by means of examples.

DETAILED DESCRIPTION

EXAMPLE 1

Fallen, mixed autumn foliage of different roadside trees picked up on a rainy day by the garbage truck of a German city were dried indoors for 48 hours, so that 62.5% by weight of the water was removed. This material was comminuted to approximately 1/25 of its initial volume.

4,000 g of municipal sewage sludge with a 10% by weight solids content were thoroughly mixed with 871 g of the dried, comminuted autumn foliage and were converted into a plastic material in a kneader. The plastic material was formed into fuel briquettes, which were dried in air. These briquettes burned with a yellow flame and gave a calorific value of approximately 4,300 kcal/kg.

EXAMPLE 2

Comminuted, dried autumn foliage was extracted in three-stage manner with acetone/methanol/water according to DOS No. 3243282.8 and the aforementioned Muller U.S. application Example 7 and the extraction residue was dried in air. 4,000 g of a sewage sludge according to Example 1 were processed with 485 g of this extraction residue of dried autumn foliage until a shapable mixture was obtained. Cubes were formed from this mixture and dried to a residual moisture content of approximately 4%. It was possible to burn test cubes weighing approximately 2 g over a moderately powerful Bunsen flame in a procelain crucible, the briquette material igniting after 45 seconds and burning for approximately 3 minutes with a yellow flame. The ash was washed out with cold water giving 21.4% of water-soluble constituents containing 0.35 mg/l of phosphorus, 20 mg/l of $NO_3$, and 100 mg/l of potassium and 8 mg/l of $NH_4$, as well as heavy metals.

EXAMPLE 3

Approximately 20% of the necessary quantity, i.e. 12 g of dried, comminuted autumn foliage were stirred into a settling tank with approximately 250 ml of digested sewage sludge and a solids content of approximately 3% by weight. A relatively rapid sedimentation of the turbidities was observed after approximately 4 hours. The relatively clear, aqueous liquid was decanted or sucked off. The remaining quantity of the dried autumn foliage, namely 48 g, was then stirred in, until a kneadable material was obtained, which could be processed into briquettes and dried in air.

In the solvent extraction as set forth in the above mentioned Muller U.S. patent application, different solvent groups can be used with different dielectric constants and e.g. in a three-stage extraction, it is possible to start with solvents having a lower dielectric constant and then continuing the extraction in stages with solvents having higher dielectric constants. In such a multistage extraction process, different products are obtained in each stage.

When using solvents with a dielectric constant of $\xi = <30$ (solvent group A) 4 to 10% by weight of waxes, resins, essential oils and alkaloids are obtained. Examples of such solvents are trichloroethylene, Katron 113 or acetone.

By extraction with solvents having a dielectric constant of $\xi = 30–80$ (solvent group B), 10 to 20% by weight of carbohydrate, protein, dyes, tannins, organic bases, acids or salts are obtained. Examples of such solvents are methanol and water.

When using solvents with a dielectric constant of $\xi = >80$ (solvent group C), 10 to 20% by weight of pectins and pentosans are obtained. Examples of such solvents are aqueous sulfuric acid, aqueous potassium hydroxide and aqueous sodium hydroxide.

Through the use of solvents, whose dielectric constants are at the limits of the aforementioned ranges and by using solvent mixtures, including those which distill azeotropically, the raw materials obtained with the aforementioned solvent groups can be obtained together, e.g. A+B together and C separately, or A separately and B+C together.

There can also be used two different solvents in the same group, e.g. methanol followed by water (both being in Group B).

What is claimed is:

1. A process for the treatment of digested sewage sludge consisting essentially of mixing the sewage sludge with comminuted, dried autumn foliage until a deformable material is obtained, the proportions of autumn foliage to sewage sludge on a dry basis being from 0.3 to 0.6 parts of sewage sludge per part of comminuted autumn foliage and being such that the mixture is bound into a cohesive plastic material, a part of the water being removed from the sewage sludge either prior to the addition of the total autumn foliage, or after a partial addition thereof.

2. A process according to claim 1 including the further step of shaping the deformable material into a fuel briquette and drying the briquette.

3. A process for the treatment of digested sewage sludge consisting essentially of mixing the sewage sludge with the solvent extraction residue of comminuted, dried, autumn foliage, the proportions of or solvent extraction residue of autumn foliage to sewage sludge being such that the mixture is bound into a cohesive plastic material, and that on a dry basis there is employed 0.6 to 1.0 part of sewage sludge per part the solvent extraction residue, wherein the solvent employed in the extraction being in either (1) solvent group A having a dielectric constant of $\xi = <30$, (2) solvent group B having a dielectric constant of $\xi = 30$ to 80 or (3) solvent group C having a dielectric constant of $\xi = >80$, a part of the water being removed from the sewage sludge either prior to the addition of the total solvent residue extraction residue of autumn foliage or after a partial addition thereof.

4. A process according to claim 3 including the further step of shaping the deformable material into a fuel briquette and drying the briquette.

5. A process according to claim 3 wherein the extraction employed at least two extractions and using solvents in succession from at least two of the solvent groups A, B and C.

6. A process according to claim 5 wherein the extraction was carried out with at least three extractions in succession employing in the successive extractions solvents from each of groups A, B and C.

7. A process according to claim 6 wherein the solvents were used in the order solvent of group A, solvent of group B and solvent of group C.

8. A process according to claim 5 wherein the extraction was carried out employing at least three extractions and using in succession a solvent from group A and then two different solvents from group B, the solvent in group B having the lower dielectric constant being employed before the solvent in group B having the higher dielectric constant.

9. A process according to claim 3 wherein there was employed a single solvent for a plurality of successive extractions.

10. A process according to claim 9 wherein the solvent was in solvent group B.

* * * * *